Sept. 10, 1935.   G. W. WHEELER   2,014,216
BAKING PAN
Filed Feb. 10, 1934
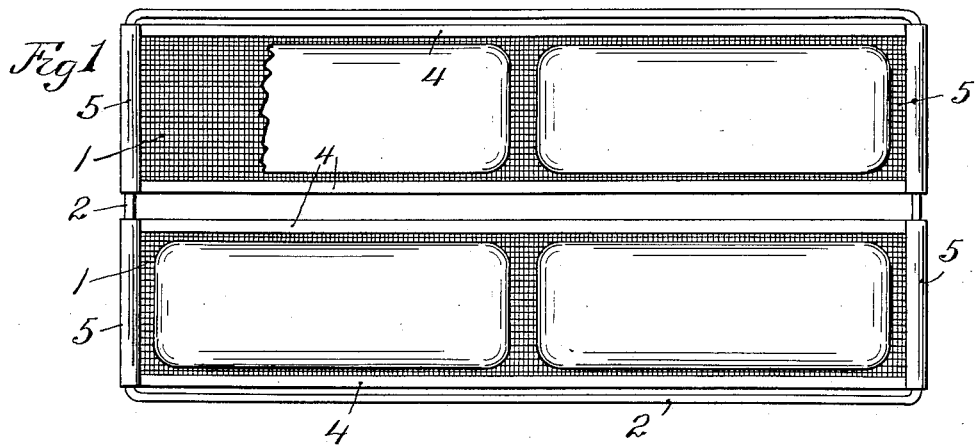
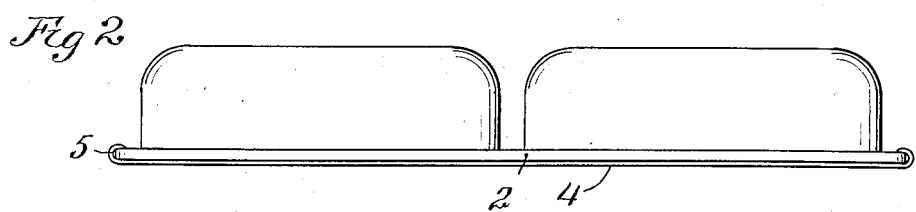
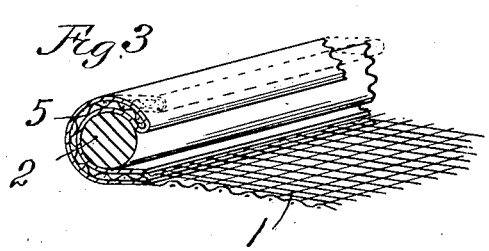
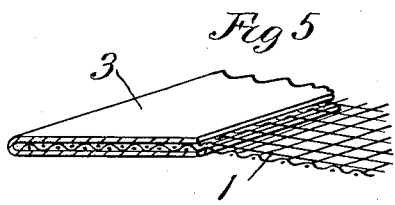
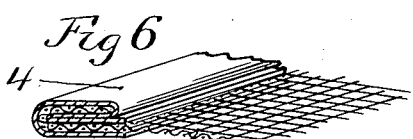
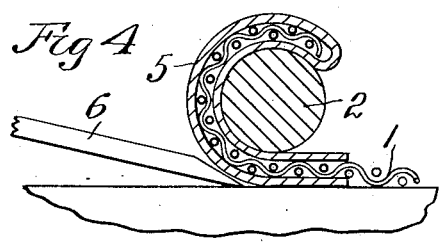
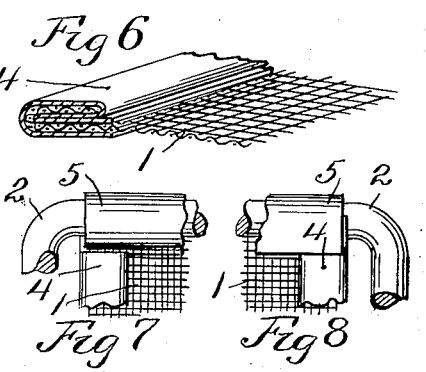
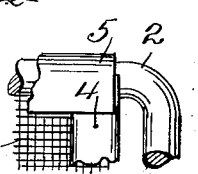
INVENTOR.
George W. Wheeler
By Warren D. House
His ATTORNEY.
Witness
H. Vernon Olson Patented Sept. 10, 1935

2,014,216

UNITED STATES PATENT OFFICE 2,014,216

BAKING PAN

George W. Wheeler, Kansas City, Mo.

Application February 10, 1934, Serial No. 710,642

5 Claims. (Cl. 53—6)

My invention relates to improvements in baking pans.

One of the objects of my invention is to provide a novel baking pan, which employs for a bottom a foraminated sheet or sheets, such as wire screening, simple, cheap, durable and effective means for securely holding and protecting from injury by abrasion, such sheet or sheets.

A further object of my invention is to provide novel means by which the loaves in a plurality of rows on the baking pan are held spaced apart.

Still another object of my invention is the provision of novel guarding means, which enables the peel to be easily and quickly slipped under the baking pan, without liability of injuring the foraminated sheets.

The novel features of my invention are hereinafter fully described and claimed.

In the accompanying drawing, which illustrates the preferred embodiment of my invention, Fig. 1 is a plan view of my improved baking pan, showing four loaves of dough, one partly broken away, disposed on the pan in operative relation thereto.

Fig. 2 is a side elevation of the same.

Fig. 3 is an enlarged perspective view of an end portion of the pan.

Fig. 4 is an exaggeratedly enlarged cross section of an end portion of the pan, showing a portion of a peel about to be inserted below the pan.

Fig. 5 is an enlarged perspective view of a portion of one of the binding channel members prior to its being given the curved form, shown in Figs. 3 and 4, or, when used as a side member, prior to its being folded, as shown in Fig. 6, and including a part of one of the foraminated sheets.

Fig. 6 is a perspective view of the portion of the binding member and foraminated sheet, shown in Fig. 5, after the folding operation.

Fig. 7 is a top view of one corner portion of the baking pan.

Fig. 8 is a bottom view of what is shown in Fig. 7.

Similar characters of reference designate similar parts in the different views.

1 designates each of two foraminated sheets, preferably wire screening, as shown, which form portions of the bottom of the baking pan. 2 designates a rectangular member, preferably a round rod formed into a rectangle, which, by means of edge binding on the sheets 1, holds the latter in spaced apart relation to each other.

The binding means for each sheet comprises the following described parts,

For binding each longitudinal edge portion of each sheet 1, there is provided a sheet metal, preferably steel or iron, channel 3 a portion of which is shown in Fig. 5. The opposite longitudinal edge portions of each sheet 1 are then respectively inserted into the two channels 3, after which each channel 3 has its outer closed longitudinal portion extended inwardly, preferably folded above and against the other portion of the channel to form a side binding member 4, as shown in Fig. 6.

From two similar channels 3 are respectively formed the end channel binding members 5, the end portions of each sheet being respectively inserted in the channels 3, as shown in Fig. 5, after which the end channel members are, preferably, upwardly and inwardly curved to U shape, as represented in dotted lines in Fig. 3. The ends of the bracing member 2 are then respectively slipped into the U shaped binding members respectively adjacent thereto, after which the latter are bent downwardly, as shown in Fig. 4 and in solid lines in Fig. 3.

The ends of the binding members 4 are respectively fastened to adjacent ends of the end binding members 5 in any desired manner, as by welding or brazing.

By having the channel members facing inwardly, and, formed as described, by flat folding the side members 4 and curving the members 5, with the edge portions of the sheets 1 included in the formed parts, the sheets are securely held in the binding members.

By forming the channels 3, in the manner described with their outer longitudinal closed portions extending inwardly, the channels facing inwardly, the screen wire 1 is protected both above and below, so as not to be liable to injury, when the pans are stacked upon each other, or when slid in or out of the oven.

By folding the sheet metal channels on the upper side, as shown in Fig. 6, the wire screen 1 is disposed only the thickness of the sheet metal from the floor of the oven, where the wire emerges from the channel member, so that the loaves of dough will rest close to the oven floor in that portion next to the side binding members 4.

By upwardly curving the end members 5, as shown, in Figs. 3 and 4, a peel 6, as shown in Fig. 4, may be easily slid under the baking pan without danger of injury thereto.

The spacing of the two screen wire members 1 apart from each other, as shown in Fig. 1, holds the dough loaves on one member 1 from getting into close contact with the loaves on the other member 1, thus enabling steam and heat entering between the two sets of loaves.

What I claim is:—

1. A baking pan having for a bottom a foraminated sheet, and an inwardly facing channel member into which an edge portion of said sheet extends, the closed outer longitudinal portion of said member, with an included portion of said sheet, extending inwardly.

2. A baking pan having for a bottom a foraminated sheet, and an inwardly facing channel member into which an edge portion of said sheet extends, the closed outer longitudinal portion of said member, with an included portion of said sheet, extending inwardly above the other portion of said member.

3. A baking pan having for a bottom a foraminated sheet, and an inwardly facing channel member into which an edge portion of said sheet extends, the closed outer longitudinal portion of said member, with an included portion of said sheet, being folded inwardly against the other portion of said member.

4. A baking pan having for a bottom a foraminated sheet, and an inwardly facing channel member into which an edge portion of said sheet extends, the closed outer longitudinal portion of said member, with an included portion of said sheet, being folded inwardly above and against the other portion of said member.

5. A baking pan having for a bottom a rectangular foraminated sheet, and four inwardly facing channel members into which the edge portions of said sheet respectively extend, the closed outer longitudinal portion of each of said members, with an included portion of said sheet, extending inwardly.

GEORGE W. WHEELER.